(12) United States Patent
Anderson

(10) Patent No.: US 7,854,527 B2
(45) Date of Patent: Dec. 21, 2010

(54) COMBINATION LED FIXTURE AND RACEWAY

(76) Inventor: Kenneth E. Anderson, P.O. Box 1090, Kearney, NE (US) 68848-1090

( * ) Notice: Subject to any disclaimer, the term of this patent is extended or adjusted under 35 U.S.C. 154(b) by 172 days.

(21) Appl. No.: 12/380,189

(22) Filed: Feb. 25, 2009

(65) Prior Publication Data
US 2010/0214770 A1 Aug. 26, 2010

(51) Int. Cl.
F21V 33/00 (2006.01)
F21V 21/00 (2006.01)
F21V 11/00 (2006.01)

(52) U.S. Cl. ............... 362/133; 362/217.1; 362/249.02; 362/368

(58) Field of Classification Search ................. 362/127, 362/133, 147, 217.01, 217.02, 217.1, 217.11, 362/217.12, 217.13, 219, 220, 221, 222, 362/223, 225, 249.02, 249.03, 277, 311.02, 362/368, 374, 375, 648; 174/48, 68.1, 101, 174/480, 481, 491, 500, 504
See application file for complete search history.

(56) References Cited

U.S. PATENT DOCUMENTS

| D194,870 | S | 3/1963 | Hill | |
|---|---|---|---|---|
| 5,031,083 | A * | 7/1991 | Claesson | 362/249.06 |
| 5,765,939 | A * | 6/1998 | Tanner, Jr. | 362/219 |
| 5,831,211 | A * | 11/1998 | Gartung et al. | 174/498 |
| D431,529 | S | 10/2000 | Giese | |
| 6,497,586 | B1 | 12/2002 | Wilson | |
| 7,156,694 | B1 | 1/2007 | Anderson | |
| 7,208,676 | B2 * | 4/2007 | VanderVelde | 174/496 |
| 7,267,461 | B2 * | 9/2007 | Kan et al. | 362/373 |
| 2010/0103657 | A1 * | 4/2010 | Teng et al. | 362/223 |
| 2010/0135020 | A1 * | 6/2010 | Moore | 362/249.02 |

* cited by examiner

Primary Examiner—Jong-Suk (James) Lee
Assistant Examiner—David R Crowe
(74) Attorney, Agent, or Firm—Dennis L. Thomte; Thomte Patent Law Office LLC

(57) ABSTRACT

A combination under-cabinet LED fixture and raceway is comprised of an upper housing member to which either a lower housing member may be secured thereto to create an LED fixture or to which a raceway cover may be secured thereto to create a raceway. A modified form of the invention comprises an upper housing member and a lower housing member with the lower housing member being selectively reversibly inserted into the upper housing member to form either a raceway or an LED fixture.

16 Claims, 7 Drawing Sheets

COMBINATION LED FIXTURE AND RACEWAY

BACKGROUND OF THE INVENTION

1. Field of the Invention

This invention relates to a combination under-cabinet LED fixture and raceway which is comprised of an upper housing, a lower housing, and a raceway cover. Even more particularly, the instant invention relates to a fixture and raceway wherein the upper housing and lower housing may be snap fitted together to create an LED fixture and wherein the raceway cover could be snap fitted to the upper housing to create a raceway. Still more particularly, a modified embodiment is disclosed wherein the under-cabinet LED fixture and raceway is comprised of two parts.

2. Description of the Related Art

Under-cabinet lighting is frequently used in kitchens, laundry rooms, etc. In recent years, LEDs have become very popular forms of under-cabinet lighting. A problem exists in providing a mounting means or an enclosure for the LEDs as well as providing wire chasers or raceways for the LED fixtures and associated wiring. In the past, LED fixtures have been provided but those fixtures have been unable to conveniently provide wiring chases or raceways. Further, wiring chases and raceways have been provided but those wiring chases and raceways are not ideally suited as LED fixtures. In other words, a person had to separately purchase LED fixtures and raceways.

SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

A combination under-cabinet LED fixture and raceway is described which is comprised of an elongated upper housing, an elongated lower housing and an elongated raceway cover. The upper housing includes a base portion having first and second side edges, a top surface and a bottom surface with first and second side walls extending downwardly from the base portion adjacent the first and second side edges thereof respectively. The base portion of the upper housing is adapted to be secured to a cabinet thereabove. Each of the side walls of the upper housing have upper and lower ends and inner and outer surfaces. Each of the outer surfaces of the first and second side walls of the upper housing have alternating, horizontally extending ridges and grooves formed therein.

The elongated lower housing has upper and lower ends, a first side and a second side. The lower housing has first and second side walls at its upper end which have inner and outer surfaces. Each of the inner surfaces of the first and second side walls of the lower housing have alternating, horizontally extending ridges and grooves formed therein which are adapted to frictionally receive the first and second side walls of the upper housing so that the ridges and grooves of the side walls of the lower housing and the ridges and grooves of the side walls of the upper housing may be snapped together to selectively secure the lower housing to the upper housing and to define a wire chase or passageway therebetween. The lower housing member has an elongated opening formed therein which extends upwardly thereinto its lower end. A light emitting source is positioned in the lower housing which directs light downwardly through the elongated opening in the lower housing member. A lens is snap fitted into the lower end of the lower housing below the light emitting source.

The raceway cover comprises a bottom wall having first and second side walls extending upwardly therefrom which have inner and outer surfaces and wherein the inner surfaces of the first and second side walls of the raceway cover have alternating, horizontally extending ridges and grooves formed therein which are adapted to frictionally receive the first and second side walls of the upper housing so that the ridges and grooves of the side walls of the raceway cover and the ridges and grooves of the side walls of the upper housing may be snapped together to selectively secure the raceway cover to the upper housing to define a raceway passage therebetween. Thus, the lower housing may be secured to the upper housing to provide an LED fixture. In the alternative, the lower housing is not utilized and the raceway cover is snap fitted onto the upper housing member to define a raceway therein.

In a modified form of the invention, the under-cabinet LED fixture is comprised of two components or parts.

It is therefore a principal object of the invention to provide an improved LED fixture.

A further object of the invention is to provide a combination LED fixture and raceway.

A further object of the invention is to provide an upper housing, a lower housing and a raceway cover which may be assembled or snapped together to create either an LED fixture or a raceway.

A further object of the invention is to provide an LED light fixture which has a minimum height.

A further object of the invention is to provide a raceway which has a minimum height.

A further object of the invention is to provide a combination LED fixture and raceway which is comprised of two components or parts.

These and other objects will be apparent to those skilled in the art.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DESCRIPTION OF THE PREFERRED EMBODIMENT

Figure 1:
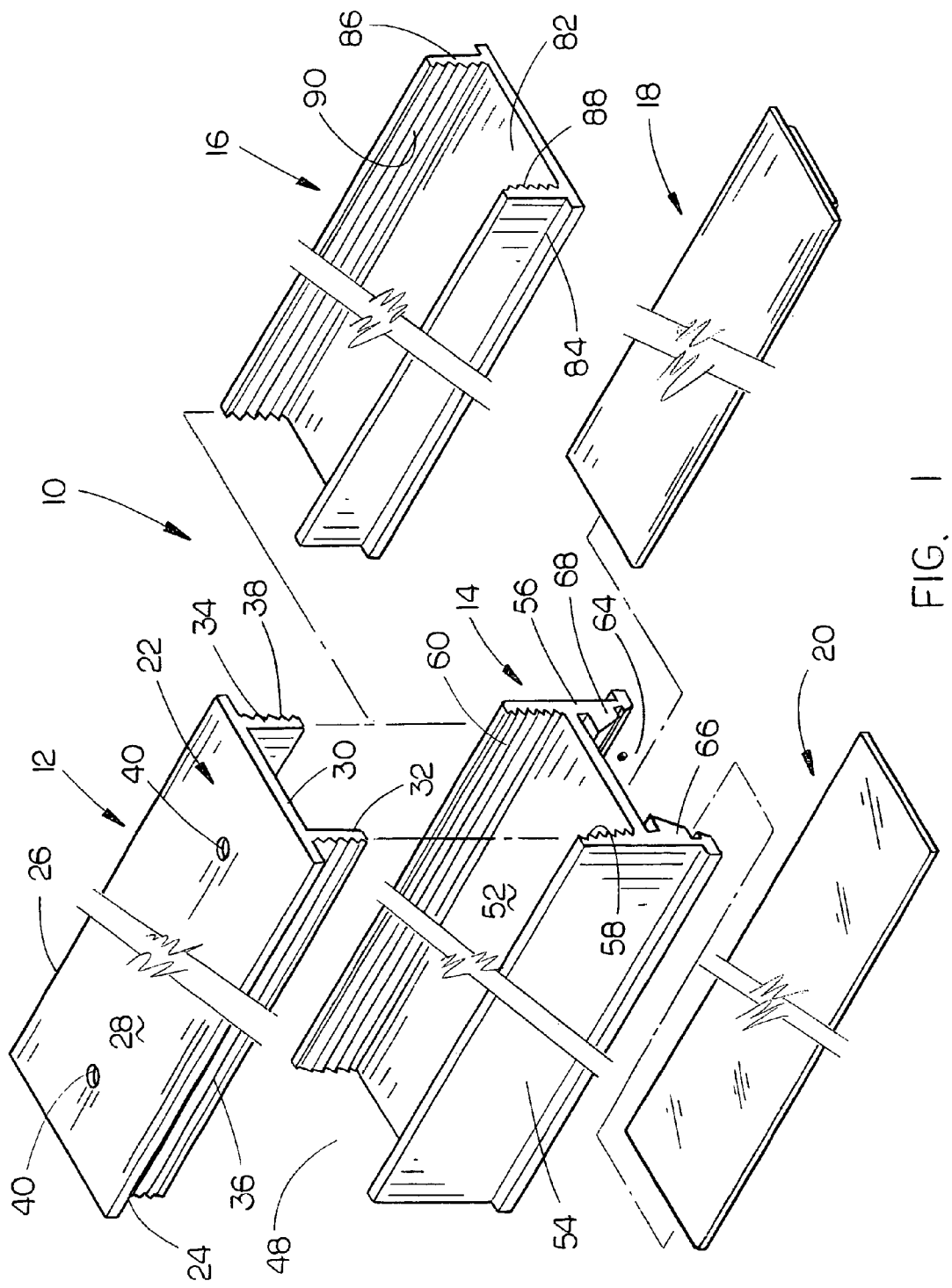
FIG. 1 is an exploded perspective view of the combination LED fixture and raceway of this invention.

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense in that the scope of the present invention is defined only by the appended claims.

In FIGS. 1-5, the combination under-cabinet LED fixture and raceway of this invention is referred to generally by the reference numeral 10 and includes an elongated upper housing 12, an elongated lower housing 14, an elongated raceway cover 16, substrate assembly 18, and lens 20. For purposes of description, upper housing 12 will be described as having a base portion 22 having side edges 24 and 26, a top surface 28, and a bottom surface 30. Base portion 22 has a pair of spaced-apart side walls 32 and 34 extending downwardly therefrom adjacent side edges 24 and 26 respectively. The outer surfaces of side walls 32 and 34 are each provided with alternating, horizontally extending ridges and grooves formed therein which are referred to generally by the reference numbers 36 and 38 respectively. Base portion 22 is preferably provided with a plurality of spaced-apart holes or openings 40 formed therein adapted to receive screws 42 to enable housing 12 to be secured to the underside of a cabinet 44 having a face board 46 extending downwardly from the front edge thereof.

Figure 3:
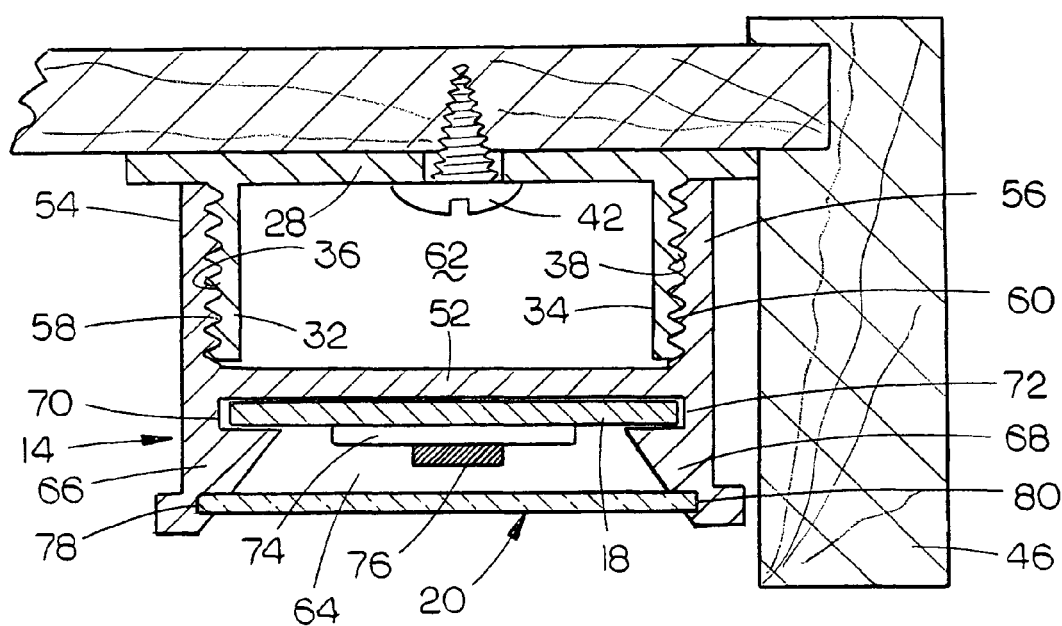
FIG. 3 is a sectional view of the LED fixture.
Figure 5:
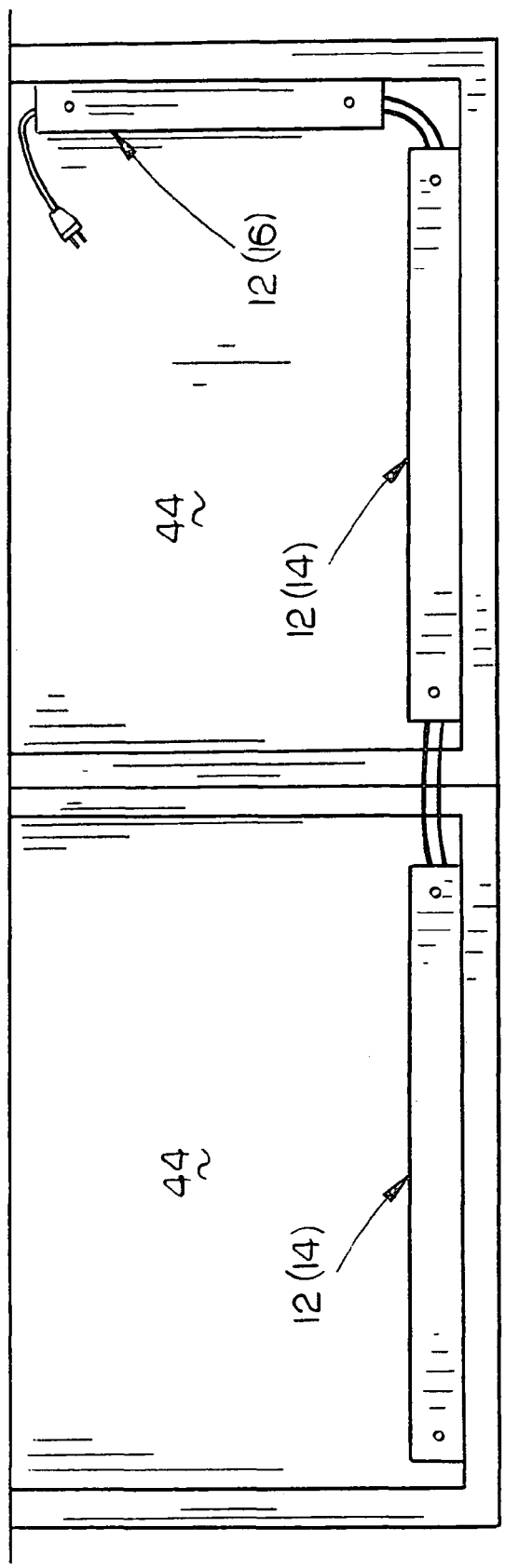
FIG. 5 is a bottom view of a cabinet having a pair of the LED fixtures mounted on the underside thereof and a raceway mounted on the underside of the cabinet.

For purposes of description, lower housing 14 will be described as having an upper end 48 and a lower end 50. Web 52 extends between side walls 54 and 56, as seen in FIG. 1. The inner surfaces of side walls 54 and 56 above web 52 are each provided with alternating, horizontally extending ridges and grooves formed therein which are generally referred to by the reference numerals 58 and 60 respectively. The side walls 54 and 56 of lower housing 14 are adapted to receive the side walls 32 and 34 of upper housing 12 with the ridges and grooves 36 and 38 of side walls 32 and 34 frictionally engaging the ridges and grooves 58 and 60 of side walls 54 and 56 respectively to snap-fit lower housing 14 to upper housing 12 as seen in FIG. 3 thereby creating a wire chase or passageway 62.

An elongated opening 64 extends upwardly into lower housing 14 to define spaced-apart leg portions 66 and 68 on opposite sides thereof. A pair of elongated grooves or slots 70 and 72 are formed in the inner surfaces of leg portions 66 and 68 respectively which longitudinally slidably receive the side edges of the substrate assembly 18 which includes a circuit board 74 having a plurality of LEDs 76 mounted thereon. The lower inner ends of leg portions 66 and 68 are provided with elongated grooves or slots 78 and 80 formed therein respectively which receive the side edges of lens 20 in a snap-fit relationship.

Raceway cover 16 includes a bottom wall 82 having side walls 84 and 86 extending upwardly therefrom in a spaced-apart relationship. The inner surfaces of side walls 84 and 86 each have alternating, horizontally extending ridges and grooves 88 and 90 formed therein respectively which are adapted to frictionally engage the ridges and grooves 36 and 38 of upper housing 12 respectively when lower housing 14 is not being utilized and it is desired to create a raceway 92 utilizing upper housing 12 and raceway cover 16.

Preferably the housings 12 and 14 and the raceway cover 16 are formed from extruded aluminum. It is preferred that the height of upper housing 12 be approximately ⅜ inch with the height of lower housing 14 being approximately ⅝ inch. It is also preferred that the height of raceway cover 16 be approximately ⅜ inch.

Thus, the lower housing 14 may be secured vertically adjustably secured to the upper housing 12 to create an under-cabinet LED fixture. In the alternative, raceway 16 may be vertically adjustably secured to upper housing 12 to create a raceway.

Figure 6:
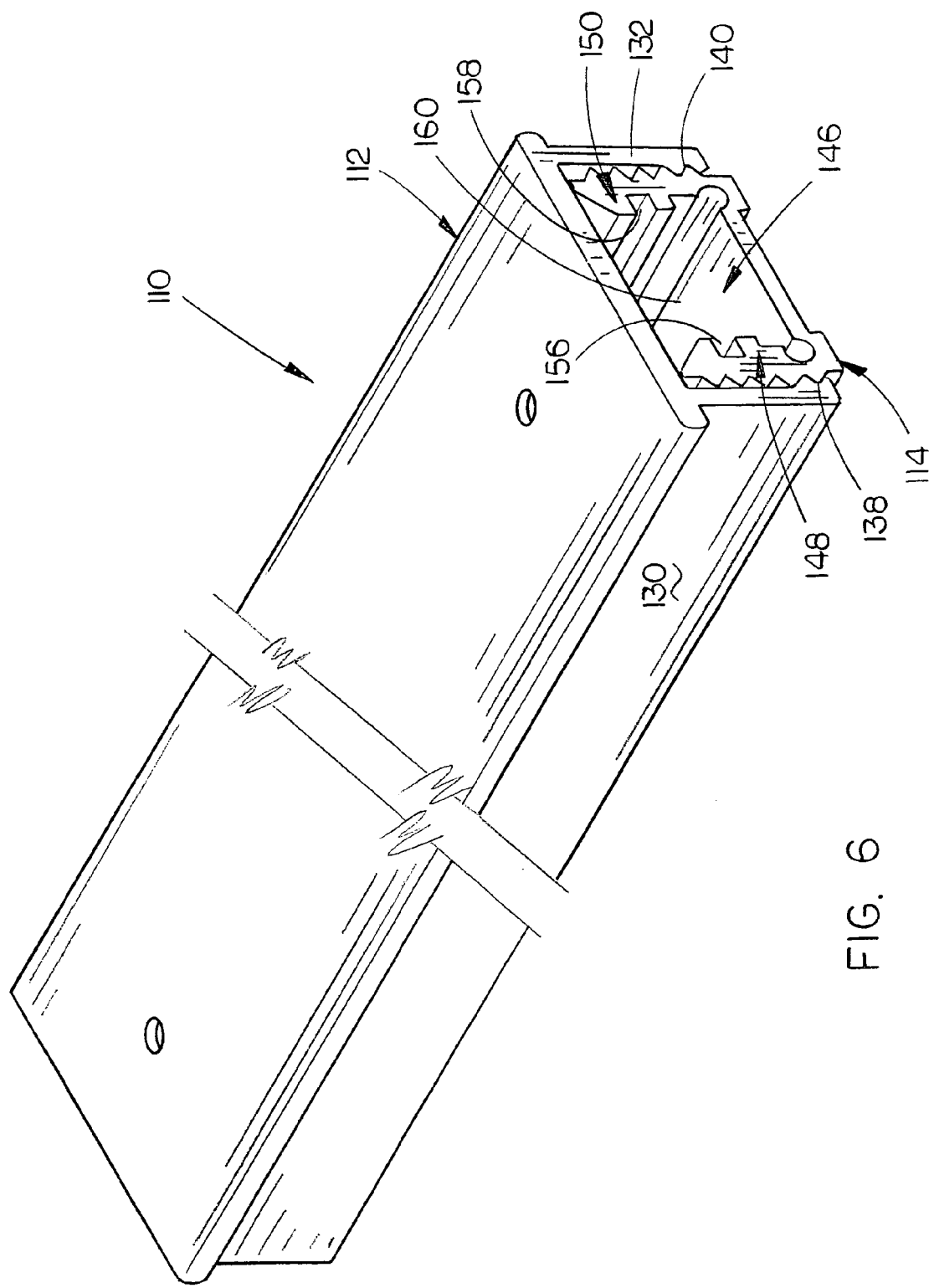
FIG. 6 is a partial perspective view of a modified form of the invention which is comprised of two parts and which is shown to be assembled together to form a raceway.
Figure 7:
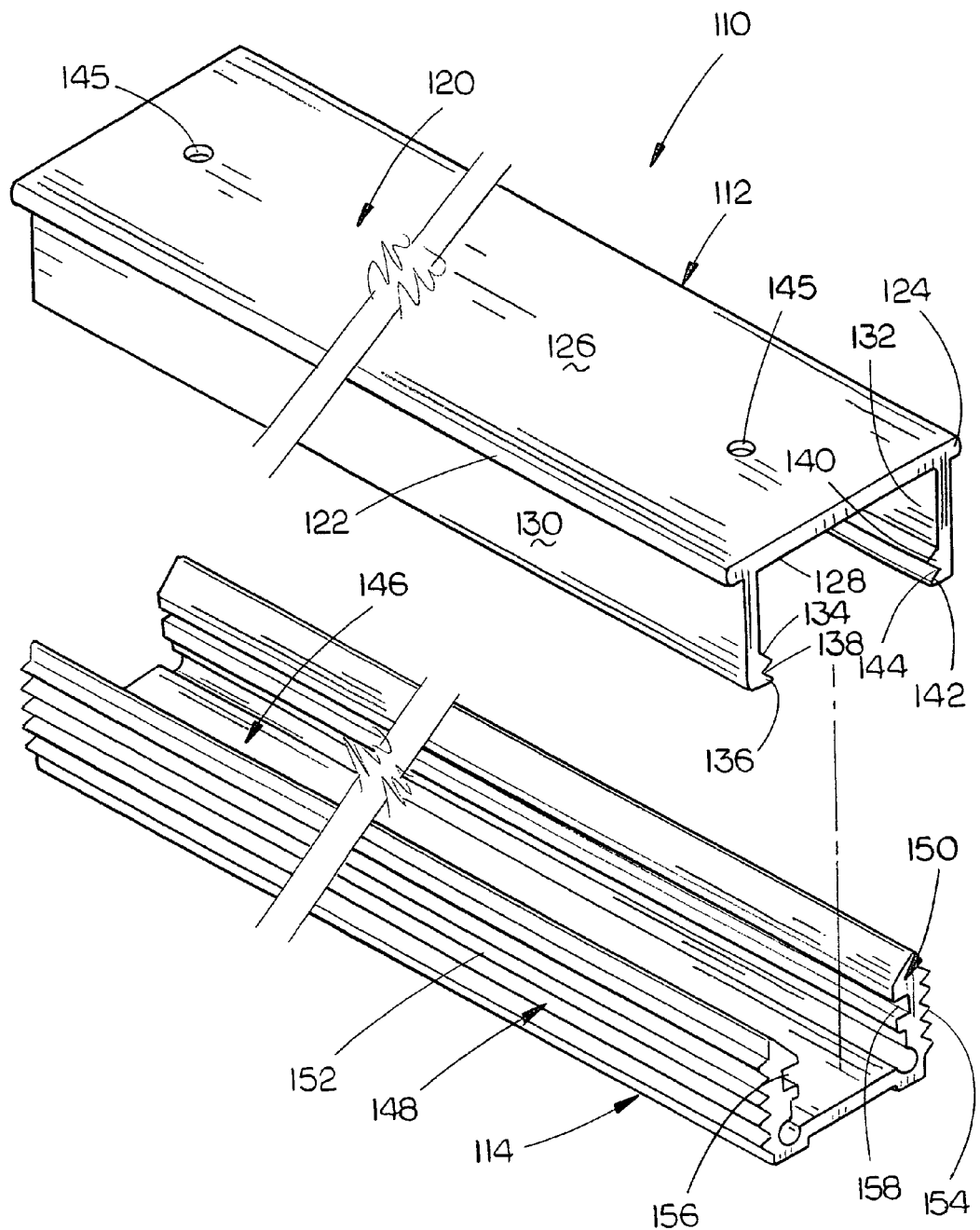
FIG. 7 is an exploded perspective view of the embodiment of FIG. 6.
Figure 8:
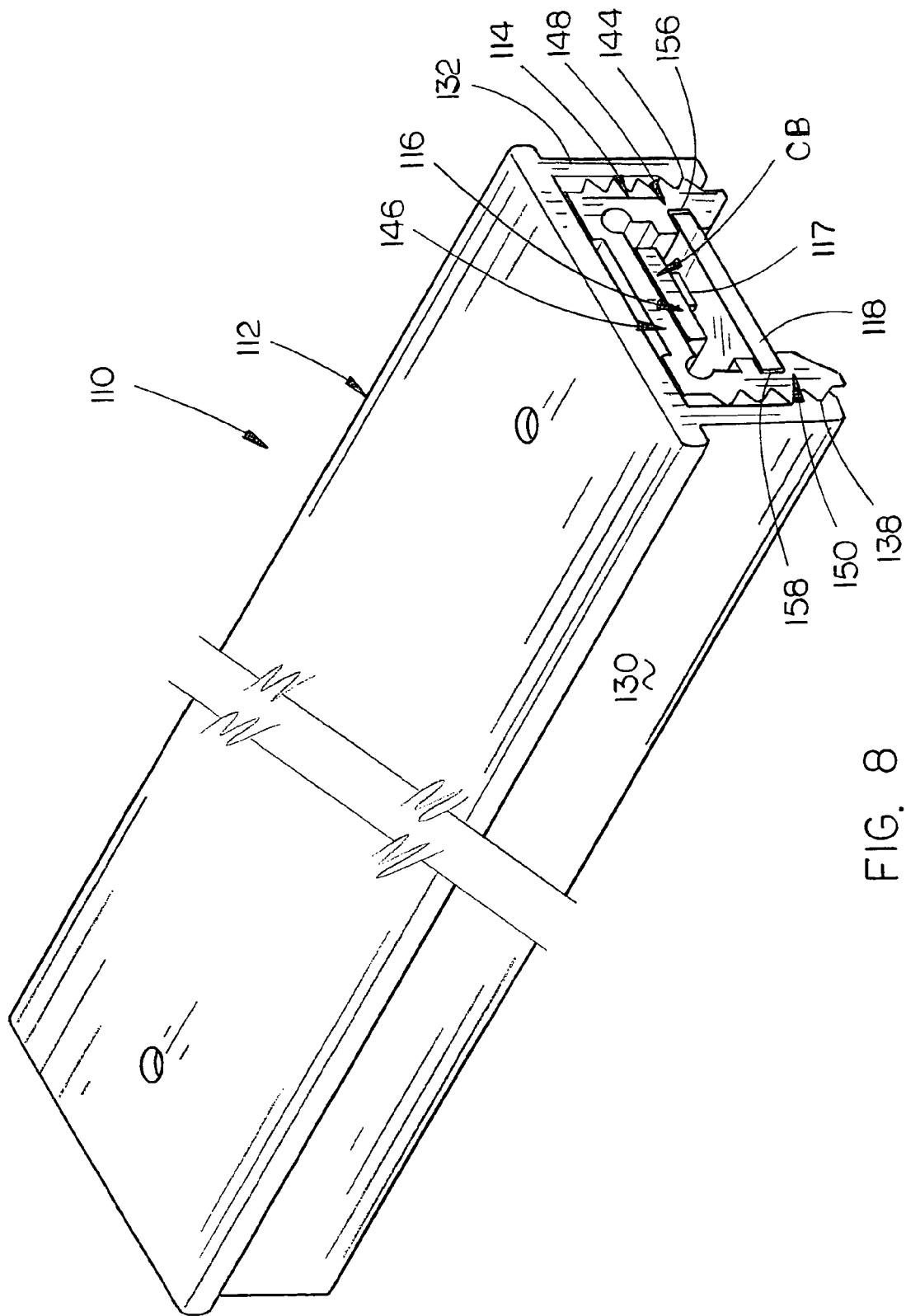
FIG. 8 is a partial perspective view of the embodiment of FIGS. 6 and 7 and which illustrates the same assembled together to form an LED fixture.

A modified form of the combination under-cabinet LED fixture and raceway 110 is illustrated in FIGS. 6-8 which is comprised of two parts or components as opposed to the three-part combination LED fixture and raceway of FIGS. 1-5.

Figure 2:
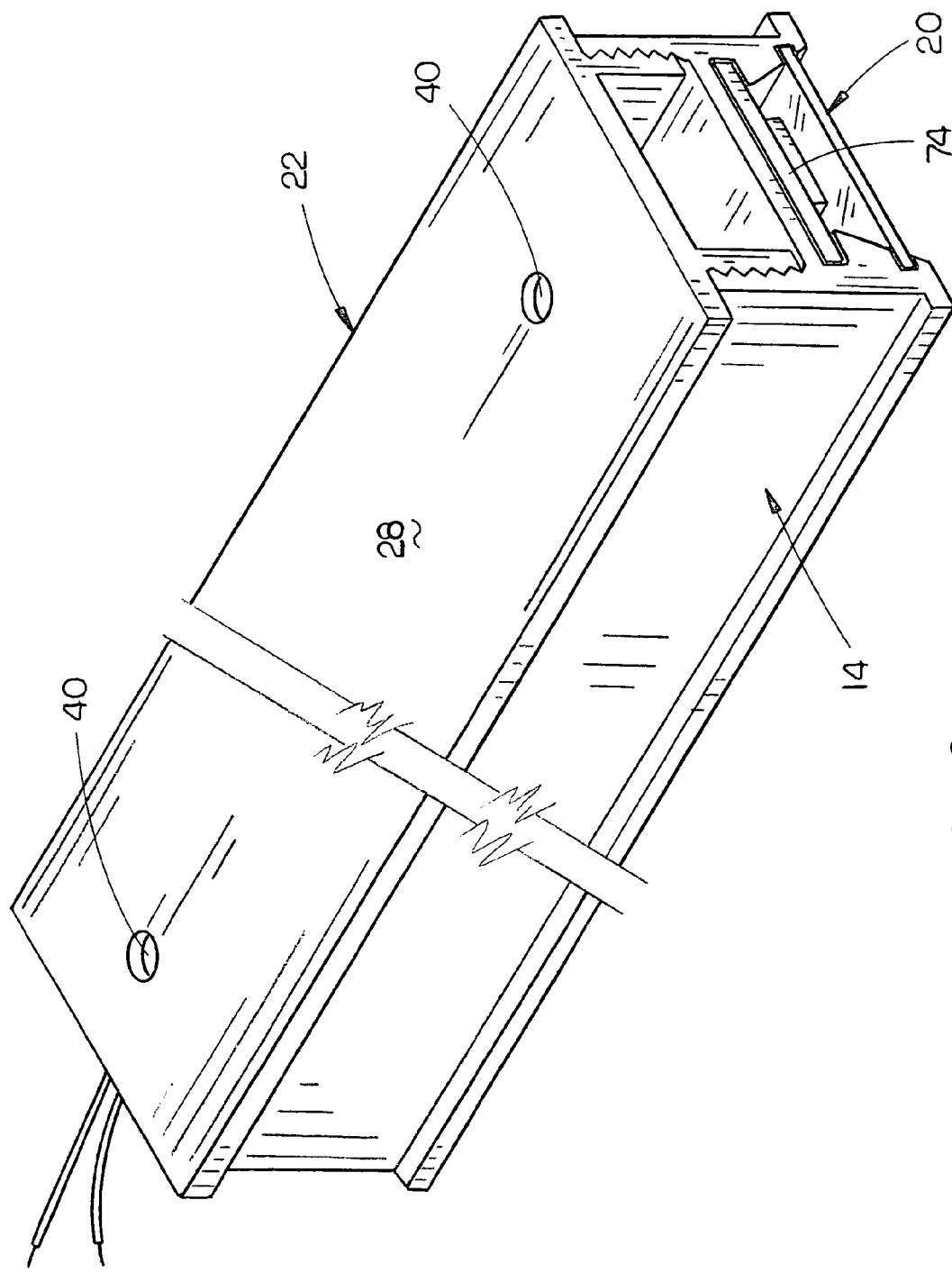
FIG. 2 is a perspective view of the LED fixture of this invention.
Figure 4:
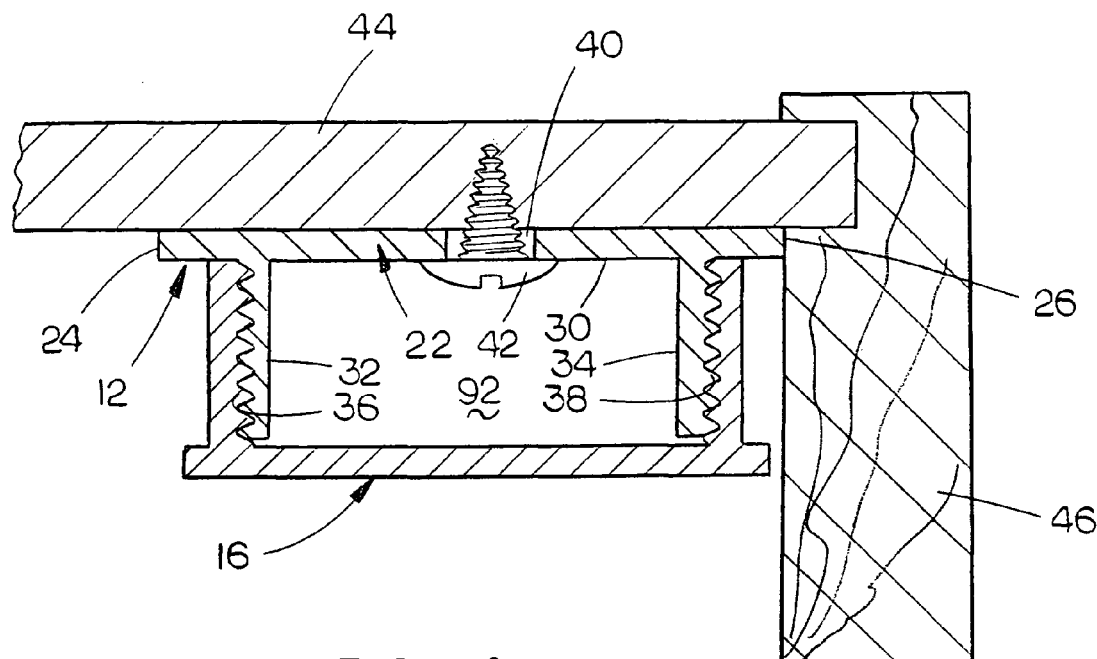
FIG. 4 is a sectional view of the raceway.

The modified combination under-cabinet LED fixture and raceway 110 includes an elongated upper housing 112, an elongated lower housing 114, substrate assembly 116 and lens 118. Substrate assembly 116 includes a circuit board (CB) and a plurality of LEDs 117. For purposes of description, upper housing 112 will be described as having a base portion 120 having side edges 122 and 124, a top surface 126, and a bottom surface 128. This portion 120 has a pair of spaced-apart side walls 130 and 132 extending downwardly therefrom adjacent side edges 122 and 124 respectively. The lower inner surface of side wall 130 is provided with a pair of horizontally extending ridges 134 and 136 formed thereon with a groove 138 formed therebetween. The lower inner surface of side wall 132 is provided with a pair of horizontally extending ridges 140 and 142 formed therein with a groove 144 formed therebetween. Base portion 120 is preferably provided with a plurality of spaced-apart holes or openings 145 formed therein adapted to receive screws therein to enable housing 112 to be secured to the underside of a cabinet having a face board extending downwardly from the front edge thereof, such as illustrated in FIGS. 2 and 3.

For purposes of description, lower housing 114 will be described as including a base portion 146 having spaced-apart side walls 148 and 150 extending therefrom. The outer surfaces of side walls 148 and 150 each have a plurality of horizontally extending alternating ridges and grooves formed therein which are referred to by the reference numerals 152 and 154 respectively. The inner surfaces of side walls 148 and 150 are each provided with an elongated groove formed therein, referred to by the reference numerals 156 and 158 respectively, adapted to receive the side edges of the lens 118. Substrate assembly 116 is secured to the inner surface of base portion 146 of lower housing 114 as illustrated in the drawings.

FIG. 6 illustrates the lower housing member 114 inserted into the upper housing 112 between the side walls 130 and 132 thereof to form a raceway 160. The alternating ridges on the side walls 148 and 150 of lower housing 114 are adjustably received within the grooves 138 and 144 respectively to adjustably yieldably maintain the lower housing 114 within the upper housing 112. When the upper and lower housing 112 and 114 are being used as a raceway, the substrate and lens will normally not be secured to the inner surface of the base portion 146 nor will there be a lens inserted into the grooves or slots 156 and 158.

When it is desired to create an LED fixture, the lower housing 114 is inserted into the upper housing 112 between the walls 130 and 132 thereof so that the base portion 146 is uppermost with the side walls 148 and 150 extending downwardly therefrom, as illustrated in FIG. 8. The alternating ridges on the side walls 148 and 150 are received by the grooves 144 and 138 respectively to yieldably maintain the lower housing 114 within the upper housing 112. When the lower housing is in the position of FIG. 8, the substrate assembly 116 will be secured to the underside of base portion 146 as will the LEDs 117 so that light will be directed downwardly therefrom through the lens 118 positioned in the grooves 156 and 158.

Thus, it can be seen that a unique combination LED fixture and raceway is provided which includes an upper housing and a lower housing with the lower housing being inserted into the upper housing in one manner to form a raceway and which may be inserted into the upper housing 112 in another manner to provide an LED fixture.

Thus, it can be seen that the embodiment of FIGS. 6-8 accomplishes at least all of its stated objectives.

Although the invention has been described in language that is specific to certain structures and methodological steps, it is to be understood that the invention defined in the appended claims is not necessarily limited to the specific structures and/or steps described. Rather, the specific aspects and steps are described as forms of implementing the claimed invention. Since many embodiments of the invention can be practiced without departing from the spirit and scope of the invention, the invention resides in the claims hereinafter appended.

The invention claimed is:

1. An under-cabinet light fixture, comprising:
   an elongated upper housing member including a base portion having first and second side edges, a top surface and a bottom surface with first and second side walls extending downwardly from said base portion adjacent said first and second side edges respectively;
   said base portion of said upper housing member adapted to be secured to a cabinet thereabove;
   each of the side walls of said upper housing member having upper and lower ends and inner and outer surfaces;
   each of said outer surfaces of said first and second side walls of said upper housing member having alternating, horizontally extending ridges and grooves formed therein;
   an elongated lower housing member having upper and lower ends, a first side and a second side;
   said lower housing member having first and second side walls at its upper end which have inner and outer surfaces;
   each of said inner surfaces of said first and second side walls of said lower housing member having alternating, horizontally extending ridges and grooves formed therein which are adapted to frictionally receive said first and second side walls of said upper housing member so that the ridges and groves of said side walls of said lower housing member and said upper housing member may be snapped together to selectively secure said lower housing member to said upper housing member and to define a wire chase passageway therebetween;
   said lower housing member having an elongated opening formed therein which extends upwardly thereinto into said lower end;
   and a light emitting source positioned in said lower housing member which directs light downwardly through said elongated opening in said lower housing member.

2. The light fixture of claim 1 wherein a lens is secured to said lower housing member below said light source.

3. The light fixture of claim 1 wherein said light source comprises a plurality of LEDs mounted on a substrate.

4. The light fixture of claim 3 wherein said substrate is horizontally longitudinally slidably mounted in said lower housing member.

5. The light fixture of claim 4 wherein said lower housing member has a pair of spaced-apart horizontally extending grooves formed therein which slidably receive said substrate.

6. The light fixture of claim 2 wherein said lens is selectively snap-fitted to said lower housing member.

7. The light fixture of claim 1 wherein said lower housing member is selectively vertically adjustably secured to said upper housing member.

8. The light fixture of claim 1 wherein an elongated raceway cover replaces said lower housing and said light emitting source.

9. The light fixture of claim 8 wherein said raceway cover comprises a bottom wall member having first and second side walls extending upwardly therefrom which have inner and outer surfaces and wherein said inner surfaces of said first and second side walls of said raceway cover have alternating, horizontally extending ridges and grooves formed therein which are adapted to frictionally receive said first and second side walls of said upper housing member so that the ridges and grooves of said side walls of said raceway cover and said upper housing member may be snapped together to selectively secure said raceway cover to said upper housing member and to define a raceway passageway therebetween.

10. A combination under-cabinet LED fixture and raceway, comprising:
    an elongated upper housing member including a base portion having first and second side edges, a top surface and a bottom surface with first and second side walls extending downwardly from said base portion adjacent said first and second side edges respectively;
    said base portion of said upper housing member adapted to be secured to a cabinet thereabove;
    each of the side walls of said upper housing member having upper and lower ends and inner and outer surfaces;
    each of said outer surfaces of said first and second side walls of said upper housing member having alternating, horizontally extending ridges and grooves formed therein;
    an elongated lower housing member having upper and lower ends, a first side and a second side;
    said lower housing member having first and second side walls at its upper end which have inner and outer surfaces;
    each of said inner surfaces of said first and second side walls of said lower housing member having alternating horizontally extending ridges and grooves formed therein which are adapted to functionally receive said first and second side walls of said upper housing member so that the ridges and groves of said side walls of said lower housing member and said upper housing member may be snapped together to selectively secure said lower housing member to said upper housing member and to define a wire chase passageway therebetween;
    said lower housing member having an elongated opening formed therein which extends upwardly thereinto into said lower end;
    and a light emitting source positioned in said lower housing member which directs light downwardly through said elongated opening in said lower housing member;
    an elongated raceway cover which may be selectively substituted for said lower housing and components thereof;
    said raceway cover comprises a bottom wall member having first and second side walls extending upwardly therefrom which have inner and outer surfaces and wherein said inner surfaces of said first and second side walls of said raceway cover have alternating, horizontally extending ridges and grooves formed therein which are adapted to frictionally receive said first and second side walls of said upper housing member so that the ridges and grooves of said side walls of said raceway cover and said upper housing member may be snapped together to selectively secure said raceway cover to said upper housing member and to define a raceway passageway therebetween.

11. The combination of claim 10 wherein said lower housing member may be selectively vertically adjustably secured to said upper housing member.

12. The combination of claim 10 wherein said raceway cover may be selectively adjustably secured to said upper housing member.

13. A combination under-cabinet LED fixture and raceway, comprising:
an elongated upper housing member including a base portion having first and second side edges, a top surface and a bottom surface with first and second side walls extending downwardly from said base portion of said upper housing adjacent said first and second side edges respectively;
said base portion of said upper housing member adapted to be secured to a cabinet thereabove;
each of the side walls of said upper housing member having upper and lower ends and inner and outer surfaces;
an elongated lower housing member having a base portion with first and second side walls extending therefrom;
said base portion of said lower housing having inner and outer surfaces;
said side walls of said lower housing member having inner and outer surfaces;
said lower housing member adapted to be selectively attachable to said upper housing member in a first manner and a second manner;
said lower housing member, when attached to said upper housing member in said first manner, having said base portion thereof and said first and second side walls thereof received between, said first and second walls of said first housing whereby said first and second walls of said lower housing member extend downwardly from said base portion of said lower housing;
said lower housing member, when attached to said upper housing member in said second manner, having said base portion thereof and said first and second side walls thereof received between said first and said side walls of said upper housing member with said first and second side walls extending upwardly from said base portion of said lower housing member to form a raceway between said base portions of said upper and lower housing members;
said lower housing member, when attached to said upper housing member in said first manner, having a plurality of LEDs mounted at said inner surface thereof so that said upper and lower housing members form an LED fixture.

14. The combination of claim 13 wherein said lower housing member may be selectively vertically adjustably secured to said upper housing member.

15. The combination of claim 13 wherein a lens is secured to said side walls of said lower housing member below said LEDs when said lower housing member is attached to said upper housing member in said first manner.

16. The combination of claim 13 wherein said inner surfaces of said side walls of said upper housing member and outer surfaces of said side walls of said lower housing member have cooperating surfaces thereon for attaching said lower housing member to said upper housing member in either of said first and second manners.

* * * * *